(12) United States Patent
Yamamoto

(10) Patent No.: US 12,196,417 B2
(45) Date of Patent: Jan. 14, 2025

(54) METHOD AND APPARATUS FOR TREATING COMBUSTIBLE SUBSTANCE

(71) Applicant: Taiheiyo Engineering Corporation, Tokyo (JP)

(72) Inventor: Yasushi Yamamoto, Tokyo (JP)

(73) Assignee: Taiheiyo Engineering Corporation, Tokyo (JP)

( * ) Notice: Subject to any disclaimer, the term of this patent is extended or adjusted under 35 U.S.C. 154(b) by 524 days.

(21) Appl. No.: 17/629,637

(22) PCT Filed: Aug. 6, 2019

(86) PCT No.: PCT/JP2019/030925
§ 371 (c)(1),
(2) Date: Jan. 24, 2022

(87) PCT Pub. No.: WO2021/024386
PCT Pub. Date: Feb. 11, 2021

(65) Prior Publication Data
US 2022/0235933 A1 Jul. 28, 2022

(51) Int. Cl.
*F23G 5/027* (2006.01)
*F23G 5/44* (2006.01)

(52) U.S. Cl.
CPC ............. *F23G 5/027* (2013.01); *F23G 5/442* (2013.01); *F23G 2201/40* (2013.01); *F23G 2201/701* (2013.01); *F23G 2205/16* (2013.01)

(58) Field of Classification Search
None
See application file for complete search history.

(56) References Cited

U.S. PATENT DOCUMENTS 4,022,629 A * 5/1977 Garrett ...................... C04B 7/44
106/758
4,508,573 A * 4/1985 Harris ....................... F23K 1/00
423/244.05

(Continued)

FOREIGN PATENT DOCUMENTS

JP 2005097063 4/2005
JP 2006342046 A 12/2006

(Continued)

OTHER PUBLICATIONS

European Search Report for EP 19 94 0176; mailed Mar. 13, 2023.
International Search Report and Written Opinion for PCT/JP2019/030925; mailed Oct. 29, 2019.

*Primary Examiner* — David J Laux
(74) *Attorney, Agent, or Firm* — Stetina Brunda Garred & Brucker

(57) ABSTRACT

A treatment method and apparatus is provided to effectively use a combustible waste such as waste plastic, waste tires, rice husk, wood shavings, PKS, RDF and sludge while maintaining stable operation; to improve the combustion efficiency of a fossil fuel such as coal and coke; and furthermore to reduce the NOx concentration in a cement kiln exhaust gas. An apparatus 1 for treating a combustible, the apparatus comprising: a mixer 3 for mixing a combustible C with a preheated raw material R2, which has a temperature of 600° C. or higher and 900° C. or lower and which is drawn from a preheater cyclone of a cement burning device 10, to gasify the combustible; and a feeder 5 for feeding the gasified combustible and the preheated raw material (mixed raw material M) to a region from an inlet end 13*a* of the cement burning device to a calciner 12. When the combustible and the preheated raw material are mixed, moisture may be added to cause water gas shift reaction, and the resultant water gas and the preheated raw material may (Continued)

be introduced to the region from the inlet end of the cement burning device to the calciner.

2 Claims, 1 Drawing Sheet

(56) References Cited

U.S. PATENT DOCUMENTS

| | | | | | |
|---|---|---|---|---|---|
| 4,600,438 | A | * | 7/1986 | Harris | F23K 1/00 |
| | | | | | 106/758 |
| 4,913,742 | A | * | 4/1990 | Kwech | C04B 7/434 |
| | | | | | 106/758 |
| 5,156,676 | A | * | 10/1992 | Garrett | C04B 7/4438 |
| | | | | | 106/758 |
| 5,336,317 | A | | 8/1994 | Beisswenger et al. | |
| 6,773,259 | B1 | * | 8/2004 | Bech | F27B 7/2025 |
| | | | | | 432/58 |
| 2003/0143508 | A1 | | 7/2003 | Ramesohl et al. | |
| 2011/0073014 | A1 | * | 3/2011 | Hjuler | F27B 7/2058 |
| | | | | | 432/106 |
| 2016/0046525 | A1 | * | 2/2016 | Schuermann | C04B 7/44 |
| | | | | | 106/796 |
| 2019/0024976 | A1 | * | 1/2019 | Lebæk | F27B 7/20 |
| 2019/0047911 | A1 | * | 2/2019 | Schuermann | C04B 7/365 |

FOREIGN PATENT DOCUMENTS

| | | |
|---|---|---|
| JP | 2007205640 A | 8/2007 |
| JP | 2008114173 | 5/2008 |
| JP | 2009300006 A | 12/2009 |
| JP | 2010043269 A | 2/2010 |
| JP | 2012078032 | 4/2012 |
| JP | 2018155484 A | 10/2018 |
| JP | 6476165 B2 | 3/2019 |

* cited by examiner

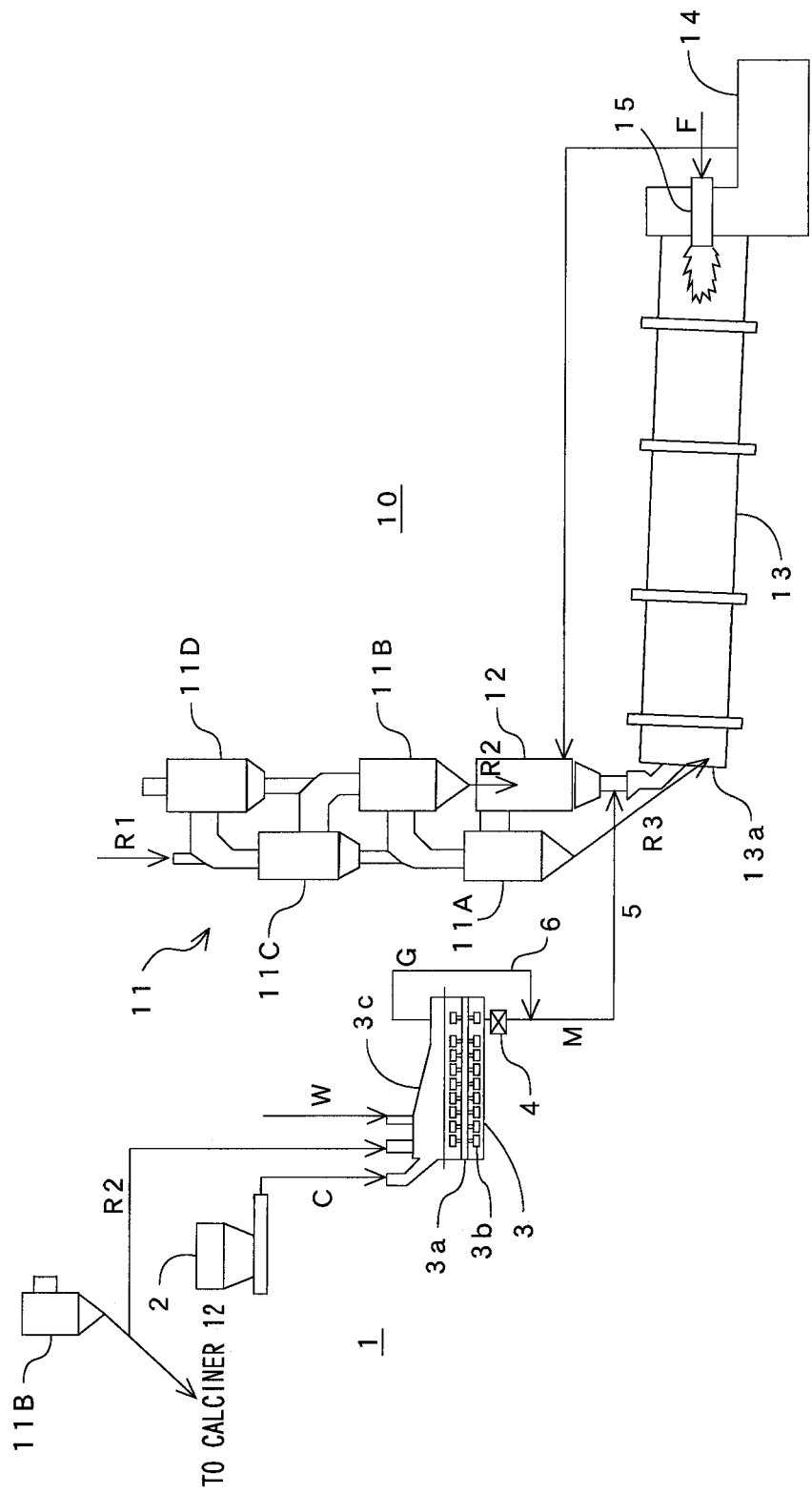

METHOD AND APPARATUS FOR TREATING COMBUSTIBLE SUBSTANCE

CROSS-REFERENCE TO RELATED APPLICATIONS

The present application claims priority to International Patent Application No. PCT/JP2019/030925 filed on Aug. 6, 2019, the disclosure of which is incorporated herein by reference.

STATEMENT RE: FEDERALLY SPONSORED RESEARCH/DEVELOPMENT

Not Applicable

BACKGROUND

1. Technical Field

The present invention relates to a technique for effectively using a combustible waste such as waste plastic, waste tires, rice husk, wood shavings, PKS, RDF and sludge while maintaining stable operation; to improve the combustion efficiency of a fossil fuel such as coal and coke; and furthermore to reduce the NOx concentration in a cement kiln exhaust gas.

2. Description of the Related Art

General waste such as municipal waste and industrial waste such as sludge are either landfilled as they are or incinerated in a waste incinerator and others. Incinerated ash generated at the incineration is brought to a final disposal site, but the remaining capacity of the final disposal site is becoming tight due to the difficulty of establishing a new final disposal site in recent years. Then, combustible waste such as waste plastic and sludge is incinerated or gasified for effective use (refer to Patent Document 1 for example). In addition, there are techniques for burning combustible waste in an inlet end of a cement kiln or a calciner, but in order to increase the amount of treating, it had to be crushed into small pieces or burning time had to be changed from 1 to 3 seconds to 5 seconds or more through modification of the calciner.

In addition, since the amount of waste plastic discharged has been increasing these days, and the import of waste plastic has been banned in China and other countries, the need for waste plastic treatment is increasing at home and abroad. Further, NOx regulations for exhaust gas released into the atmosphere have been tightened in China and South Korea.

On the other hand, in cement kiln exhaust gas is included NOx due to a high temperature region of a burning zone, and when the NOx concentration is high, it is decreased by feeding denitrification agent such as urea and ammonia as well as reducing action thought combustion in a calciner. But, in the method of utilizing urea as a denitrification agent, urea is expensive, so that operation cost rises drastically. In addition, adding urea only is inefficient in denitrification, and there is a possibility that excess ammonia that is not reacted with NOx is directly discharged out of the system also.

Then, the applicant proposed a technique for efficiently reducing NOx concentration in a cement kiln exhaust gas while maintaining a preferable firing state regardless of the type of the calciner (see Patent Document 2), the technique providing a denitration burner that blows fuel and combustion air into an inlet end of a cement kiln, reducing NOx in the cement kiln exhaust gas in a low oxygen region in the inlet end, and burning the fuel to improve the decarbonization efficiency of cement raw material also.

Patent Document 1: Japanese Patent Publication No. 2018-155484 gazette Patent Document 2: Japan Patent No. 6476165 gazette.

BRIEF SUMMARY

When a combustible waste such as waste plastic, waste tires, rice husk, wood chips, PKS, RDF and sludge is gasified, tar is generated, which causes a problem that stable operation is hindered by adhesion, clogging or the like. In addition, the danger of explosion due to combustion could not be denied.

On the other hand, regarding the denitration of the cement kiln exhaust gas, in the two-stage combustion of coal described in Patent Document 2, the amount of NOx reducing agent was insufficient so that the denitration effect was not sufficient, and coating adhered to a coal introduction portion, and others.

Then, the present invention has been made in view of the above-mentioned problems in the prior art, and the object thereof is to effectively use a combustible waste such as waste plastic, waste tires, rice husk, wood shavings, PKS, RDF and sludge while maintaining stable operation; to improve the combustion efficiency of a fossil fuel such as coal and coke; and furthermore to reduce the NOx concentration in a cement kiln exhaust gas.

In order to attain the above object, the present invention relates to a combustible treatment method, and the method is characterized by including the steps of: mixing a combustible with a preheated raw material, which has a temperature of 600° C. or higher and 900° C. or lower and which is drawn from a raw material chute of a preheater cyclone of a cement burning device, to gasify the combustible; and feeding the gasified combustible and the preheated raw material to a region from an inlet end of the cement burning device to a calciner.

With the present invention, mixing a combustible such as combustible waste and fossil fuel with the preheated raw material avoids adhesion troubles due to tar generated during gasification, and so on. Further, a reducing substance can be generated by gasifying a combustible in an oxygen-free state, and $Fe_2O_3$ in the preheated raw material can also be reduced to FeO, which increases the amount of reducing agent. Furthermore, since combustion time can be shortened through gasification, combustible wastes can be effectively burned even in a conventional coal combustion calciner with a residence time of exhaust gas in the calciner of 1 to 3 seconds, which enables reductions in the amount of coal used and in the amount of CO generated. The gasified combustible containing reducing agent and the preheated raw material containing reducing agent are supplied to a region from an inlet of a cement burning device to a calciner, and the powder and gas can be dispersed in the gas, and NOx in the cement kiln combustion gas can be effectively reduced. Further, introducing the gasified combustible and the preheated raw material into the calciner avoids the adhesion trouble of coating. Further, since combustion time can be shortened through gasification, power for crushing the combustible can be reduced.

In the combustible treatment method, when the combustible and the preheated raw material are mixed, moisture may be added to cause water gas shift reaction, and the resultant water gas and the preheated raw material may be introduced to the region from the inlet end of the cement burning device to the calciner. Since it is sealed with steam without introducing oxygen, there is no danger of explosion, a reducing agent H2 is generated through water gas shift reaction, and Fe2O3 in the raw material is also reduced to FeO, so that the amount of reducing agent is dramatically increased. Thereby, NOx in the cement kiln combustion gas can be effectively reduced.

In addition, the present invention relates to a combustible treatment apparatus, and the apparatus is characterized by including: a mixer for mixing a combustible with a preheated raw material, which has a temperature of 600° C. or higher and 900° C. or lower and which is drawn from a raw material chute of a preheater cyclone of a cement burning device, to gasify the combustible; and a feeder for feeding the gasified combustible and the preheated raw material to a region from an inlet end of the cement burning device to a calciner.

With the present invention, mixing a combustible such as combustible waste and fossil fuel with the preheated raw material avoids adhesion troubles due to tar generated during gasification, and so on. Further, a reducing substance can be generated by gasifying a combustible in an oxygen-free state, and Fe2O3 in the preheated raw material can also be reduced to FeO, which increases the amount of reducing agent. Furthermore, since combustion time can be shortened through gasification, combustible wastes can be effectively burned even in a conventional coal combustion calciner with a residence time of exhaust gas in the calciner of 1 to 3 seconds, which enables reductions in the amount of coal used and in the amount of CO generated. The gasified combustible containing reducing agent and the preheated raw material containing reducing agent are supplied to a region from an inlet of a cement burning device to a calciner, and the powder and gas can be dispersed in the gas, and NOx in the cement kiln combustion gas can be effectively reduced. Further, introducing the gasified combustible and the preheated raw material into the calciner avoids the adhesion trouble of coating. Further, since combustion time can be shortened through gasification, power for crushing the combustible can be reduced.

The above combustible treatment apparatus may further include a moisture adding device for adding moisture to the mixer to cause water gas shift reaction. With the moisture adding device, the risk of explosion is eliminated, a reducing agent H2 is generated through water gas shift reaction, and Fe2O3 in the raw material is also reduced to FeO, so that the amount of reducing agent is dramatically increased and NOx in the cement kiln combustion gas can be effectively reduced. Further, since the water gas shift reaction is an endothermic reaction and basically temperature does not rise too much, the material of the mixer can be SUS310S. Even if temperature rises, it absorbs heat due to evaporation of water and decarbonation of the raw material, so that the temperature rises only up to 850° C.

As described above, with the present invention, it is possible to effectively use a combustible waste such as waste plastic and sludge while maintaining stable operation; to improve the combustion efficiency of a fossil fuel such as coal and coke; and furthermore to reduce the NOx concentration in a cement kiln exhaust gas.

BRIEF DESCRIPTION OF THE DRAWING

FIG. 1 is a schematic view showing a combustible treatment apparatus according to an embodiment of the present invention.

DETAILED DESCRIPTION

FIG. 1 shows a combustible treatment apparatus according to an embodiment of the present invention, and the treatment apparatus 1 is provided with a hopper 2 for receiving a combustible C, a mixer 3 for gasifying the combustible C supplied from the hopper 2 by mixing the combustible C with a preheated raw material R2 of 600° C. or higher and 900° C. or lower, which is drawn from a cyclone 11B in the second stage from the bottom of a preheater 11 of a cement burning device 10, and a feeder 5 for suppling the gasified combustible C and the preheated raw material R2 (including a non-gasified combustible C, hereinafter referred to as "mixed raw material M") to a region from an inlet end 13a of a cement kiln 13 to a calciner 12 of the cement burning device 10. Although two cyclones 11B are drawn in FIG. 1 for the convenience of explanation, they are the same.

The combustible C to be treated includes a combustible waste such as waste plastic, waste tires, rice husk, wood shavings, PKS, RDF and sludge, and a fossil fuel such as coal and coke.

The mixer 3 is a pug mill or the like in which many blades 3b are attached to a horizontal shaft 3a, and rotating the horizontal shaft 3a allows the blades 3b to be rotated also, and mixes the combustible C with the preheated raw material R2 to gasify the combustible C.

A water spray device (not shown) is provided above the mixer 3, and sprays water into the mixer 3 (moisture W is supplied) to carry out water gas shift reaction. The mixer 3 is provided with a hood 3c in order to prevent scattering dust from increasing due to the sudden generation of water vapor.

A shut damper 4 is installed below the mixer 3, and introducing a mixed raw material M to the region from the inlet end 13a of the cement kiln 13 to the calciner 12 of the cement burning device 10 via the feeder 5 while maintaining airtightness. Further, an exhaust duct 6 for discharging the gasified gas G is provided, and the gas G discharged from the exhaust duct 6 merges with the mixed raw material M below the shut damper 4, and is introduced into the region from the inlet end 13a of the cement kiln 13 to the calciner 12 of the cement burning device 10 via the feeder 5. As the feeder 5, a chute, a duct or a transporter is used.

The cement burning device 10 to which the processing device 1 is attached is provided with the preheater 11 for preheating the cement raw material R1, the calciner 12 for calcining the preheated raw material R2 from the cyclone 11B in the second stage from the bottom of the preheater 11, the cement kiln 13 for firing the raw material R3 from the lowermost cyclone 11A of the preheater 11 with the fuel F blown from the main burner 15, a clinker cooler 14 for cooling cement clinker fired in the cement kiln 13, and the like, and these components are identical to the conventional ones. It is preferable that at the supply position of the mixed raw material M with the feeder 5, the powder or granular material dispersion device of Japan Patent No. 6396433 by the present applicant is installed, and the gasified combustible C and the preheated powdery raw material are effectively dispersed into the gas.

Next, a method for treating combustible with the treatment device 1 will be described with reference to FIG. 1.

During the operation of the cement burning device 10, the combustible C received in the hopper 2 is supplied to the mixer 3, and a part of the preheated raw material R2 discharged from the cyclone 11B of the preheater 11 is drawn, and the drawn raw material R2 is introduced into the mixer 3. The preheated raw material R2 that is not drawn is decarbonated in the calciner 5 and the lowermost cyclone 11A as usual, and then fired in the cement kiln 13 to generate cement clinker.

In the mixer 3, the combustible C and the preheated raw material R2 are conveyed while being mixed and stirred, and the combustible C is heated and gasified with the separated preheated raw material R2, and water is sprayed from the water spray device to carry out water gas shift reaction. Mixing the combustible C with the preheated raw material R2 avoids adhesion trouble due to tar generated during gasification. Further, acid gas generated from the combustible C can be fixed to the preheated raw material R2. In addition, since combustion time can be shortened through gasification, it can be effectively burned even in the conventional calciner 12 for coal combustion, and the amount of coal used and the amount of CO generated can be reduced.

The mixing ratio of the combustible C and the preheated raw material R2 is not particularly limited, but when the combustible C adheres to the inside of the mixer 3 or the transport path, the mixing ratio of the preheated raw material R2 is increased. Further, when treating waste plastic or the like, it is preferable to crush it to approximately 200 mm or less in advance in the front stage of the mixer 3. Further, it is preferable that the residence time of the combustible C in the mixer 3 is 5 to 15 minutes, the rotation speed of the horizontal axis 3a of the mixer 3 is variable, and the residence time can be adjusted.

Further, since the mixer 3 is sealed with water vapor without introducing oxygen, there is no danger of explosion, and a reducing agent H2 is generated though water gas shift reaction, and since Fe2O3 in the preheated raw material R2 is also reduced to FeO, the amount of reducing agent increases dramatically.

The mixed raw material M discharged from the mixer 3 is supplied to the region from the inlet end 13a of the cement kiln 13 to the calciner 12 of the cement burning device 10 with the feeder 5 via the shut damper 4. As described above, since the amount of reducing agent is dramatically increased, NOx in the cement kiln combustion gas can be effectively reduced. Further, among the mixed raw materials M, the non-gasified combustible C is used as a fuel substitute in the calciner 12, and the preheated raw material R2 drawn is decarbonated in the calciner 12 and the lowermost cyclone 11A and is fired in the cement kiln 13 to produce cement clinker.

In the above embodiment, the preheated raw material R2 is drawn from the cyclone 11B of the preheater 11, but it may be drawn from other parts if the temperature of the cement raw material to be drawn is 600° C. or more and 900° C. or less.

Further, a water spray device is provided and water is sprayed into the mixer 3 to carry out water gas shift reaction in the above embodiment. Without spraying water, simply mixing the combustible C with the drawn preheated raw material R2 for gasification avoids adhesion trouble due to tar generated during gasification, and there are effects such as shortening combustion time by gasification, and the combustible C can be effectively used and the NOx concentration in the cement kiln exhaust gas can be reduced while maintaining the stable operations of the treatment apparatus 1 and the cement burning device 10.

The configuration of the mixer 3 is not limited to the above, and if the combustible C can be mixed with the drawn preheated raw material R2 and gasified, and if water is further added to carry out water gas shift reaction, it can also be adopted in other types of devices.

DESCRIPTION OF THE REFERENCE NUMERALS

1 combustible treatment apparatus
2 hopper
3 mixer
4 shut damper
5 feeder
6 exhaust gas duct
10 cement burning device
11 preheater
12 calciner
13 cement kiln
14 clinker cooler
15 main burner

The invention claimed is:

1. A combustible treatment method comprising the steps of:
   mixing a combustible with a preheated raw material, which has a temperature of 600° C. or higher and 900° C. or lower and which is drawn from a raw material chute of a preheater cyclone of a cement burning device, to gasify the combustible; and
   feeding the gasified combustible and the preheated raw material to a region from an inlet end of the cement burning device to a calciner;
   wherein when the combustible and the preheated raw material are mixed, moisture is added to cause water gas shift reaction, and the resultant water gas and the preheated raw material are introduced to the region from the inlet end of the cement burning device to the calciner.

2. A combustible treatment apparatus comprising:
   a mixer for mixing a combustible with a preheated raw material, which has a temperature of 600° C. or higher and 900° C. or lower and which is drawn from a raw material chute of a preheater cyclone of a cement burning device, to gasify the combustible;
   a moisture adding device for adding moisture to the mixer to cause water gas shift reaction; and
   a feeder for feeding the gasified combustible and the preheated raw material to a region from an inlet end of the cement burning device to a calciner.

* * * * *